United States Patent
Kumawat et al.

(10) Patent No.: US 11,062,080 B2
(45) Date of Patent: Jul. 13, 2021

(54) APPLICATION-BASED FONT PREVIEWING

(71) Applicant: Adobe Inc., San Jose, CA (US)

(72) Inventors: Nirmal Kumawat, Rajsamand (IN); Praveen Kumar Dhanuka, Howrah (IN); Gaurishankar Kshirsagar, Bangalore (IN)

(73) Assignee: Adobe Inc., San Jose, CA (US)

( * ) Notice: Subject to any disclaimer, the term of this patent is extended or adjusted under 35 U.S.C. 154(b) by 24 days.

(21) Appl. No.: 16/566,707

(22) Filed: Sep. 10, 2019

(65) Prior Publication Data

US 2021/0073322 A1   Mar. 11, 2021

(51) Int. Cl.
  *G06F 40/106*   (2020.01)
  *G06F 21/60*    (2013.01)
  *G06F 40/109*   (2020.01)

(52) U.S. Cl.
  CPC .......... *G06F 40/106* (2020.01); *G06F 21/602* (2013.01); *G06F 40/109* (2020.01)

(58) Field of Classification Search
  None
  See application file for complete search history.

(56) References Cited

U.S. PATENT DOCUMENTS

| | | | | |
|---|---|---|---|---|
| 9,483,445 B1* | 11/2016 | Joshi | ................... | G06Q 20/123 |
| 2003/0026429 A1* | 2/2003 | Hammersmith | ...... | H04L 9/0822 380/277 |
| 2006/0170684 A1* | 8/2006 | Kobayashi | ............ | G06F 40/109 345/467 |
| 2006/0245806 A1* | 11/2006 | Furuse | ............... | G11B 20/0021 400/62 |
| 2006/0253395 A1* | 11/2006 | Corbell | ................... | G06F 21/44 705/50 |
| 2007/0159646 A1* | 7/2007 | Adelberg | ............... | G06F 40/109 358/1.11 |
| 2010/0274605 A1* | 10/2010 | Moroney | .............. | G06F 40/109 705/51 |
| 2011/0093565 A1* | 4/2011 | Bacus | ................... | G06F 40/154 709/219 |
| 2012/0260108 A1* | 10/2012 | Lee | ..................... | G06F 21/6218 713/191 |

(Continued)

OTHER PUBLICATIONS

"Which Letters in the Alphabet Are Used Most Often?", Retrieved at: https://www.lexico.com/en/explore/which-letters-are-used-most— on Jun. 11, 2019, 4 pages.

*Primary Examiner* — Howard Cortes
(74) *Attorney, Agent, or Firm* — FIG. 1 Patents

(57) ABSTRACT

In implementations of application-based font previewing, a font preview system of a computing device receives a font file corresponding to a font of a font repository via a network. The font preview system encrypts font tables of the font file and the font preview system writes the encrypted font tables to a font disk cache of the computing device. The font preview system writes metadata describing the font tables to a font memory cache of the computing device. In response to receiving a request to preview the font from an application of the computing device, the font preview system uses the metadata to identify and decrypt a particular font table of the encrypted font tables, and the application renders glyphs of the font in a user interface using the decrypted particular font table.

20 Claims, 18 Drawing Sheets

(56) References Cited

U.S. PATENT DOCUMENTS

2015/0015903 A1* 1/2015 Kanazawa ......... G06K 15/1802
                                                    358/1.11
2015/0193386 A1* 7/2015 Wurtz ................. G06F 40/109
                                                    715/269
2016/0321217 A1* 11/2016 Ikemoto ................. G06F 21/10
2019/0171694 A1* 6/2019 Borson ................. G06F 40/109

* cited by examiner

APPLICATION-BASED FONT PREVIEWING

BACKGROUND

Fonts are used to specify a size, weight, and style of a typeface (i.e., font family) for glyphs, which represent a readable character of text usable to generate digital content as well as other forms of content, e.g., printed content. There are a multitude of different fonts which are available to digital artists, and selection of specific fonts for use in digital content is an important aspect of creating such content. Due to the sheer number of fonts that are available, however, it is often not feasible to maintain a local copy (e.g., a font file) by a computing device of each of the fonts in a large collection. In other instances, use of fonts may require a license and thus font files corresponding to these fonts are not available for use by a computing device until payment of a fee.

Accordingly, techniques have been developed for font previews to evaluate the font before purchasing and/or licensing the font for use by a computing device. Conventional systems to do so, however, support a limited ability to view a rendering of "sample text" using the font and are of limited value for evaluating the font. For example, conventional font previews do not support an ability to view the font as part of digital artwork within a design application executed by a computing device. Further, because conventional previews are limited to default text, the previews may not include glyphs of interest. To address these limitations, a computing device used by a digital artist to evaluate the font using conventional techniques is forced to first acquire a font file corresponding to the font, install the font file locally at the computing device, and use the font file to render glyphs of the font in the digital artwork. If the font is not visually pleasing as part of the artwork or if the font is missing characters desired for inclusion as part of the artwork, then the digital artist is forced to abandon the font and repeat the process using the computing device. Accordingly, conventional techniques result in inefficient use of network and computation resources to acquire, render, and store font files to locate a font of interest.

SUMMARY

Systems and techniques are described for application-based font previewing. In one example, a computing device implements a font preview system locally at the computing device that is configured to access a font repository via a network such as the Internet, e.g., from a storage device via a uniform resource locator. The font preview system receives a font file via the network which corresponds to a font. This font file includes font tables which can be used to render glyphs of the font such as in a user interface of an application of the computing device. The font preview system writes font table metadata describing these font tables to a font memory cache of the computing device and also encrypts the font tables and writes the encrypted font tables to a font disk cache of the computing device.

Responsive to receiving an indication of a request to preview the font, the font preview system identifies an encrypted font table of the encrypted font tables based on the font table metadata. In an example, the font preview system receives the indication of the request to preview the font from a design application executed by the computing device. The system then decrypts the identified encrypted font table for use by the design application to render glyphs of the font as a font preview in a user interface of the application. In this way, the font preview system facilitates the font preview within the design application such that a user of the design application can fully evaluate the font as part of digital content created in the design application. By not decrypting each of the font tables of the font file, the system reduces processing time for decryption. Further, the system can remove at least a portion of the encrypted font tables from the font disk cache which minimizes an amount of disk space used to generate font previews.

The described systems improve conventional font preview technology by providing full font functionality in a font preview within a context of the design application. This enables a user of the design application to fully evaluate the font as part of digital artwork before purchasing a license to the font. Thus, the systems described improve font preview technology by supporting complete font functionality in font previews, which is not possible using conventional systems that offer "sample text" font previews.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIGS. 7A-7H are illustrations of examples of application-based font previewing.

DETAILED DESCRIPTION

Overview

Figure 1:
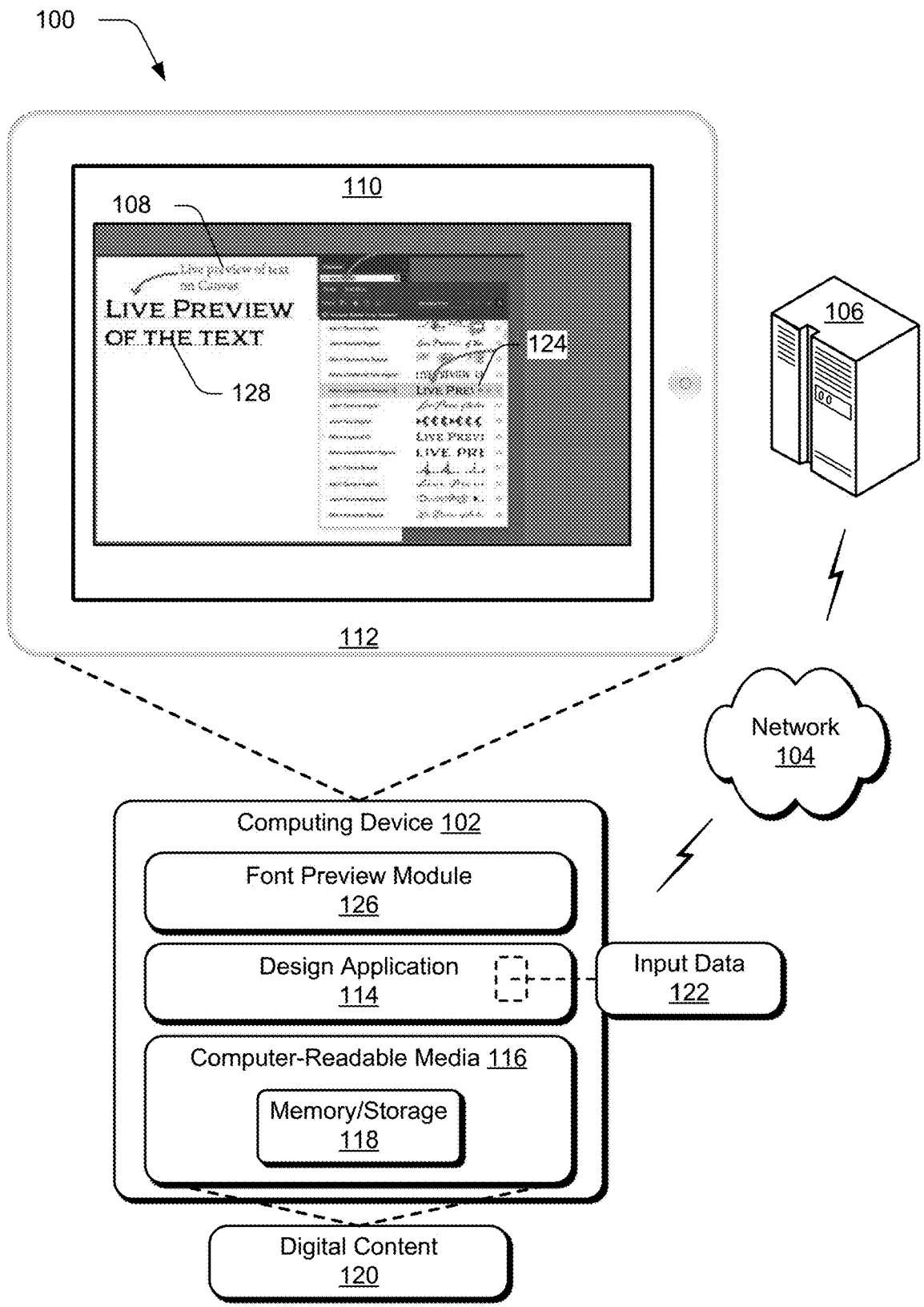
FIG. 1 is an illustration of an environment in an example implementation that is operable to employ digital systems and techniques as described herein.

Conventional font preview technology does not support fully functional font previews. Instead, previews using conventional systems are limited to samples of default text of a font which may or may not illustrate font features of interest to a user of a design application considering acquiring the font for use as part of digital content. To evaluate the font in a context of the design application, a computing device that uses conventional preview techniques is forced to download a font file corresponding to the font (which may include forcing the user to actually purchase the font), install the font file, and use the font file to render glyphs of the font. Once rendered, the glyphs may or may not be desirable to the user of the computing device, for example, based on a visual appearance of the glyphs of the font relative to the digital content. Thus, conventional font preview techniques result in an inefficient use of network and computational resources to preview fonts relative to digital content such as digital artwork.

To overcome these technological problems of conventional techniques, systems and techniques for application-based font previewing are described. In an example, a computing device implements a font preview system locally at the device. This system is configured to access a font repository via a network such as the Internet, e.g., from a storage device by way of a uniform resource locator. The font preview system forms a communication for receipt by the font repository which includes a font identification (ID) associated with a font, and the system receives a font file via the network which corresponds to the font associated with the font ID.

The font file includes font tables. Font tables are used to organize and contain data associated with aspects or features of the font such as definitions for mapping character codes to glyph index values, metrics and other data that are involved in OpenType fonts, a Compact Font Format font representation, information that describes the glyphs of the font in a TrueType outline format, etc. These font tables have the information usable to render glyphs of the font, e.g., in a user interface of an application of the computing device.

The font preview system writes font table metadata describing the font tables to a font memory cache of the computing device. In one example, the font table metadata can include a font table offset and a block key which can be used to identify particular font tables in the font file. After writing the metadata to the font memory cache, the system encrypts the font tables and writes the encrypted font tables to a font disk cache of the computing device. While encrypted, the font tables are secured so that unauthorized use of the font is prevented.

In an example, the font preview system receives an indication of a request to preview the font from a design application of the computing device. In order to generate a preview of the font, the system identifies an encrypted font table of the encrypted font tables using the font table metadata. This encrypted font table includes enough information to render glyphs of the font. The system decrypts the identified font table and writes the decrypted font table to the font memory cache. The design application uses the decrypted font table to render glyphs of the font as a font preview in a user interface of the design application. In this way, the font preview system enables generation of the font preview within the design application, and a user of the design application can fully evaluate the font as part of digital content being created using the design application.

To prevent unauthorized use of the font, the font table used to generate the font preview remains encrypted in the font disk cache and the decrypted font table is purged at a later time from the font memory cache, e.g., after a threshold amount of time. By not decrypting each of the font tables of the font file, the system reduces processing time for decryption. Further, at least a portion of the encrypted font tables (e.g., the encrypted font tables not decrypted to generate the font preview) can be removed from the font disk cache which minimizes an amount of disk space used to generate font previews.

The described systems improve content creation technology by enabling fully functional fonts for previewing within a context of a design application which is not possible using conventional font preview technology. Because of these techniques and systems, a digital artist interacting with a computing device can browse vast numbers of fonts of a font repository through an interface of the design application and also evaluate the fonts as part of digital artwork using the design application. In this manner, the digital artist is no longer forced to guess how glyphs of a particular font will appear in digital content. By removing the font tables not used to generate font previews from the font disk cache, the font preview system enables fully functional font previewing for large collections of fonts which can be previewed using a relatively small amount of disk space, thus also improving use of computational and network resources.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104 and a font repository 106 also connected to the network 104. For example, the network 104 may include the Internet. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

As illustrated, the computing device 102 is connected to the font repository 106 via the network 104. The font repository 106 may include any system through which fonts can be made available to the computing device 102. For example, the font repository 106 may be representative of a plurality of different devices, such as multiple servers utilized by an entity such as a business to make fonts available via the Internet. In this manner, fonts may be made available to the computing device 102 without necessarily being directly available or immediately accessible locally to the computing device 102. In an example, the font repository 106 may make fonts available to the computing device 102 for download and/or purchase, e.g., by a user of the computing device 102.

Once a font is made locally available to the computing device 102, the font may be rendered as glyphs 108 in a user interface 110 of a display device 112 that is communicatively coupled to the computing device 102 via a wired or a wireless connection. For example, the glyphs 108 can be rendered by a design application 114 accessing a font file corresponding to the font stored in a computer readable media 116 of the computing device 102. The computer readable media 116 is illustrated as having memory/storage 118 which may include digital content 120. In one example, the digital content 120 can include the glyphs 108 shown in the user interface 110 of the display device 112.

The design application 114 is illustrated as receiving input data 122 which includes user inputs of a user of the design application 114, e.g., as the user is creating or modifying digital content 120 via the design application 114. The input data 122 may include a user input to preview a font 124 that is not locally available to the design application 114; however, the font 124 may be available for purchase and/or download via the font repository 106 over the network 104. Consider an example in which the user of the design application 114 prefers to evaluate the font 124 before purchasing the font 124 from the font repository 106. In this example, the user may want to evaluate the font 124 relative to some particular digital content 120 before purchasing the font 124. Other examples are also contemplated, such as for fonts that are maintained remotely from the application 114 but are available for download, e.g., as part of a subscription.

A font preview module 126 of the computing device 102 has access to the design application 114. The font preview module 126 receives an indication of the user input to preview the font 124 which is not available locally to the design application 114. In response, the font preview module 126 accesses the network 104 and as part of this access, communicates a font identification (ID) corresponding to the font 124 to the font repository 106 over the network 104. The font repository 106 then receives the font ID and locates a font file corresponding to the font 124. The font repository 106 then communicates the font file to the font preview module 126 over the network 104.

The font file received by the font preview module 126 may be obfuscated, and the font preview module 126 can deobfuscate the font file. The font file includes font tables which organize and contain data associated with aspects or features of the font 124. These font tables are usable by the design application 114 to render glyphs 128 of the font 124 in the user interface 110. Examples of the font tables include a Compact Font Format (CFF) table and a Glyph Data (glyf) table which have data describing outlines of the glyphs 128. For example, an OS/2 table has data describing font-metrics information and a Character to Glyph Index Mapping (cmap) table defines the mapping of character codes to glyph index values used in the font 124.

After receiving the font file, the font preview module 126 can identify particular font tables of the font tables using font table metadata which describes the font tables. In an example, the font table metadata includes a font table offset and a block key usable to identify the font tables. The font preview module 126 encrypts the font tables of the font file to prevent unauthorized use of the font 124. In this manner, the font preview module 126 encrypts the font tables of the font file such that particular encrypted font tables are identifiable using the font table metadata.

In response to receiving an indication of a request to preview the font 124 from the design application 114, the font preview module 126 uses the font table metadata to identify a portion of the encrypted font tables. For example, the font preview module 126 may only identify the encrypted CFF table, the encrypted glyf table, the encrypted OS/2 table, and/or the encrypted cmap table. In one example, the font preview module 126 may use the font table metadata to identify a single font table of the font tables such as a custom font table. The font preview module 126 decrypts the identified font tables or table, and the design application 114 uses the decrypted font table or tables to render the glyphs 128 of the font 124 as a font preview in the user interface 110.

By decrypting a portion of the encrypted font tables of the font file solely without decrypting other font tables, the font preview module 126 reduces processing time and resources used to generate font previews. In one example, the font preview module 126 may be implemented to remove at least some of the encrypted font files from memory/storage 118, e.g., after a threshold amount of time. In this example, the font preview module 126 reduces an amount of memory/storage 118 used by the computing device for generating font previews.

Figure 2:
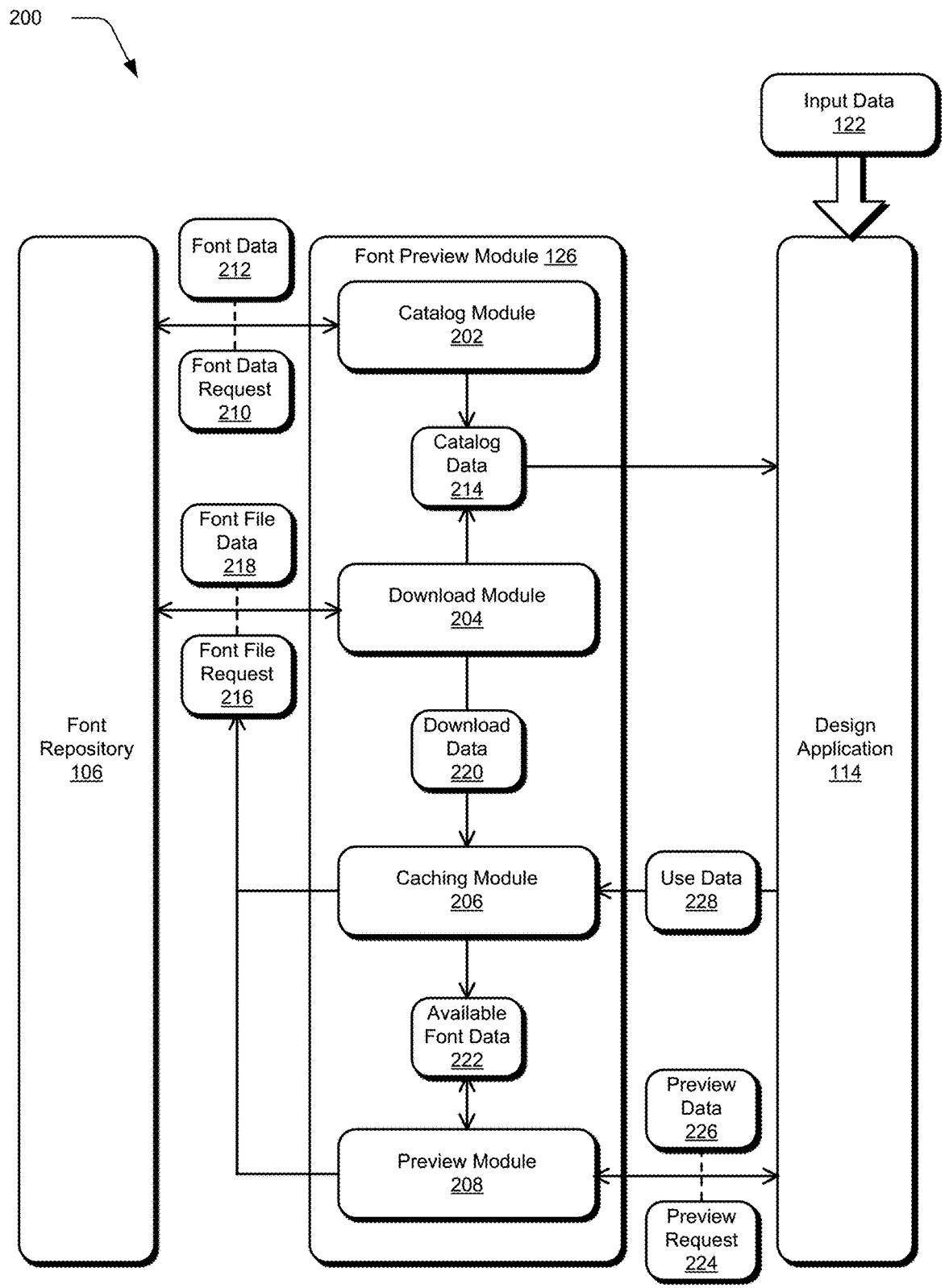
FIG. 2 depicts a system in an example implementation showing operation of a font preview module.

FIG. 2 depicts a system 200 in an example implementation showing operation of a font preview module 126. The font preview module 126 is illustrated to include a catalog module 202, a download module 204, a caching module 206, and a preview module 208. The computing device 102 implements the font preview module 126 to form a communication with the font repository 106 which includes identification of a connection to the network 104. If the connection to the network 104 is available, then the catalog module 202 sends a font data request 210 to the font repository 106 via the network 104 as part of the communication. For example, the font data request 210 may include data describing rights and/or permissions to the fonts of the font repository 106. This data can include a user identification and/or a token associated with a user of the computing device 102.

In response to receiving the font data request 210, the font repository 106 communicates font data 212 to the font preview module 126 and/or the catalog module 202. This font data 212 includes high-level and/or basic information about the fonts available at the font repository 106. In one example, the font data 212 includes a JavaScript Open Notation (JSON) file having the basic and/or high-level font information such as font names, font family names, font classifications, lists of similar fonts such as visually similar fonts, and indications of whether or not particular fonts are favorite fonts of a user of the computing device 102.

The catalog module 202 receives and processes the font data 212 to generate catalog data 214 which describes the available fonts of the font repository 106 and is locally available to the computing device 102. Thus, the design application 114 can access a list of fonts available from the font repository 106 without accessing the network 104 by accessing the catalog data 214 which is stored in memory/storage 118. In one example, a hash map or a hash table is used (e.g., stored in memory) for faster access to and searching of the fonts described by the catalog data 214.

The design application 114 processes the catalog data 214 to render a list of fonts available for previewing in the user interface 110. In one example, the design application 114 renders the list of fonts organized by font family such that each font family includes a representative or default font. In this way, the default or representative fonts may be displayed in the user interface 110 of the display device 112 such that a user may select a font family by selecting a default or representative font of the font family. For example, the user may make such a selection via interaction with an input device and/or through direct interaction with the user interface 110, and an indication of this selection is included in the input data 122.

In order to generate a preview of a font, e.g., in response to a user selection of the font, the font preview module 126 determines whether a font file corresponding to the font is available locally to the computing device 102, e.g., the font preview module may reference the catalog data 214 to determine whether the font file is available in memory/storage 118. If the font file is not available locally to the computing device 102, then the font preview module 126 obtains the font file corresponding to the font from the font repository 106. For example, the download module 204 can communicate a font file request 216 including a font identification (ID) of the font to the font repository 106 via the network 104.

Responsive to receipt of the font file request 216, the font repository 106 communicates font file data 218 including the font file to the download module 204 via the network 104. In one example, the font file data 218 includes the font file having encrypted font tables. In this example, the font tables of the font file are encrypted before the font repository 106 communicates the font file data 218 to the download module 204 via the network 104. In another example, the font file data 218 includes the font file having unencrypted font tables. In this other example, the font tables of the font file are unencrypted before the font repository 106 communicates the font file data 218 to the download module 204 via the network 104.

The download module 204 processes the font file data 218 to generate download data 220. In one example, the download module 204 may receive obfuscated font file data 218 and the download module 204 deobfuscates the obfuscated font file data 218 to generate the download data 220. In another example, download module 204 receives obfuscated font file data 218 and the download module 204 generates the download data 220 as including the obfuscated font file data 218.

The caching module 206 is illustrated as receiving the download data 220 which includes the font file. For example, the caching module 206 processes the download data 220 to generate available font data 222. In one or more implementations, the caching module 206 can receive obfuscated download data 220, and the caching module 206 deobfuscates the obfuscated download data 220. In an example, the caching module 206 encrypts font tables of the font file included in the download data 220.

As illustrated, the available font data 222 is accessible to the preview module 208 which can receive a preview request 224 from the design application 114. For example, the design application 114 receives an indication of the user request to preview the font as part of the input data 122. In response, the design application 114 generates the preview request 224 which describes the font requested for previewing. The preview module 208 processes the preview request 224 to generate preview data 226 which includes a decrypted a font table of the font file corresponding to the font requested for previewing. The design application 114 uses the decrypted font table from the preview data 226 to render glyphs of the font in the user interface 110.

As shown in FIG. 2, the caching module 206 receives use data 228 from the design application 114. This use data 228 describes glyphs of fonts rendered by the design application 114. Although illustrated as separate modules, it is to be understood that the catalog module 202, the download module 204, the caching module 206, and the preview module 208 can be implemented as a single module or these modules can be implemented as one or more additional modules.

Figure 3:
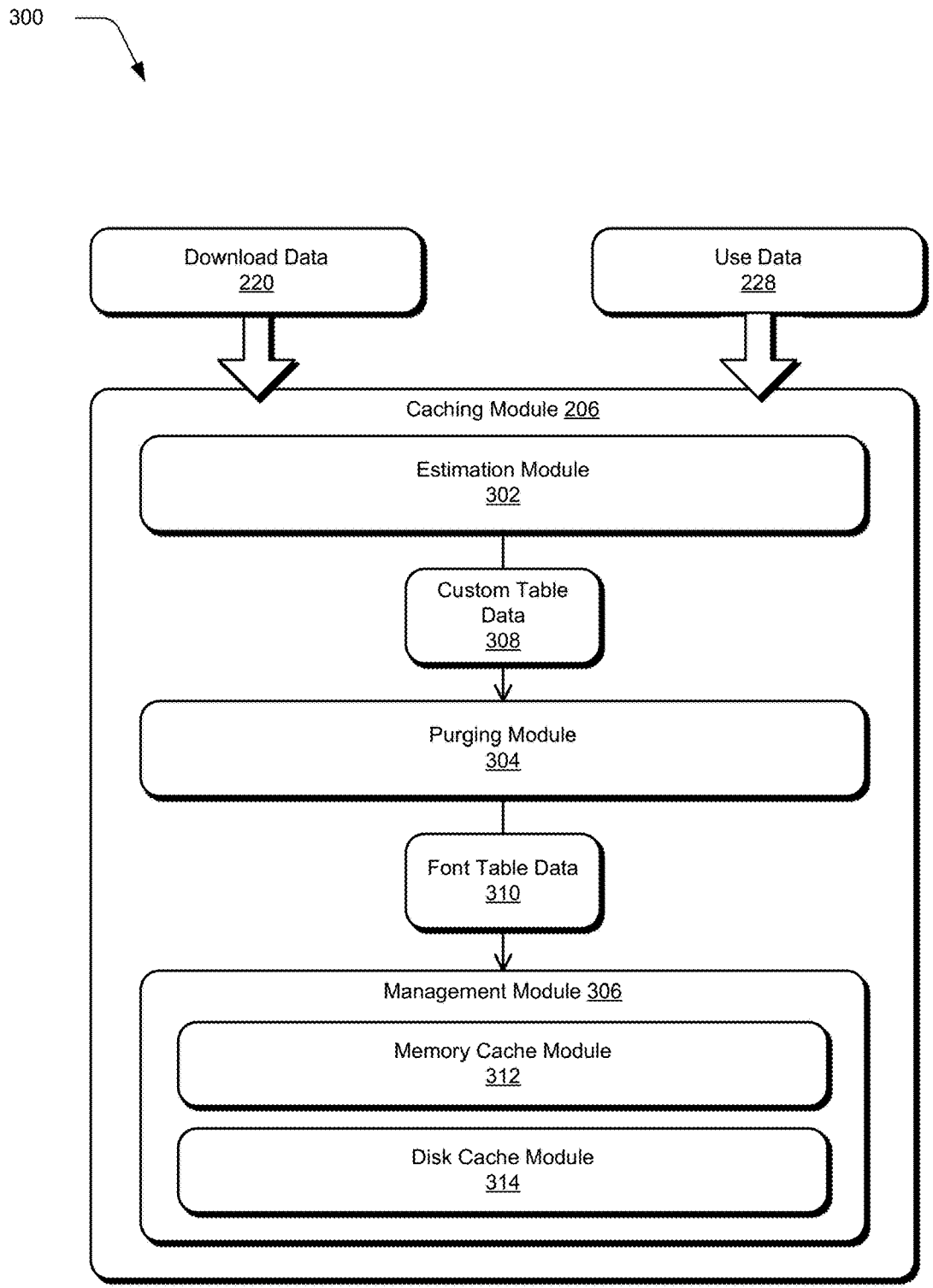
FIG. 3 depicts a system in an example implementation showing operation of a caching module.

FIG. 3 depicts a system 300 in an example implementation showing operation of a caching module 206. The caching module 206 is illustrated to include an estimation module 302, a purging module 304, and a management module 306. The caching module 206 receives the download data 220 and the use data 228 as inputs, and the estimation module 302 processes the download data 220 and the use data 228 to generate custom table data 308.

As part of generating the custom table data 308, the estimation module 302 processes the use data 228 to determine or estimate characters used by the design application 114. For example, the download data 220 includes font tables of a font file which include a Compact Font Format (CFF) table and a Glyph Data (glyf) table. The CFF table and the glyf table have data describing each of the characters of a font corresponding to the font file which causes these font tables to occupy a large portion of memory/storage 118.

However, in real-world use scenarios, only a small portion of the available characters of the font are used, e.g., less than 10 percent. In one example, the CFF table and the glyf table may include multiple different language versions of characters and a user may only use a few of the multiple different languages versions of these characters. The estimation module 302 generates the custom table data 308 as only having the characters that are used in the design application 114 based on the use data 228. In this way, the custom table data 308 can include characters usable to generate font previews while significantly reducing an amount of the memory/storage 118 used to generate the previews.

For example, the estimation module 302 processes the use data 228 to determine which characters of the CFF table and the glyf table are used in the design application 114 and then generates the custom table data 308 to have the used characters as well as characters near the used characters in Unicode planes, e.g., a Unicode block having the used characters. In this manner, the custom table data 308 includes the character information to generate font previews and the custom data 308 uses only a fraction of the memory/storage 118 occupied by the CFF table and the glyf table. In one example, this amounts to approximately a 90 percent reduction in the memory/storage 118 used for application-based font previews.

The purging module 304 receives the custom table data 308 and generates font table data 310 which is received by the management module 306. The management module 306 includes a memory cache module 312 and a disk cache module 314 which manage a font memory cache and a font disk cache of the memory/storage 118, respectively. In an example, the purging module 304 generates the font table data 310 to include the custom table data 308, an OS/2 table, and a Character to Glyph Index Mapping (cmap) table.

When purging data from the memory/storage 118, the management module 306 removes each of the font tables from the memory/storage 118 except for the font tables included in the font table data 310. For example, the memory cache module 312 removes each of the font tables from the font memory cache except for the custom table data 308. In a similar manner, the disk cache module 314 removes each of the font tables from the font disk cache except for the custom table data 308, the OS/2 table, and the cmap table. In this way, the caching module 206 can generate previews for many different fonts while only using a relatively small portion of the memory/storage 118 to generate these previews.

If the caching module 206 identifies a character is used in the design application 114 and that a font file used to render a glyph of the character is not completely available in the memory/storage 118, then the caching module 206 references a Unicode range in the OS/2 table and determines if the Unicode range has mapping in the cmap table. If the cmap table has this mapping, then the caching module 206 communicates a font file request 216 to the font repository 106 including related glyph identifications (IDs). The download module 204 receives data describing glyphs corresponding to the glyph IDs and the download module 204 includes this data in the download data 220. The caching module receives the download data 220 including the data describing the glyphs and adds the glyphs to the custom table data 308. Although illustrated as separate modules, it is to be understood that the estimation module 302, the purging module 304, and the management module 306 can be implemented as a single module or these modules can be implemented as one or more additional modules.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-3.

Figure 4:
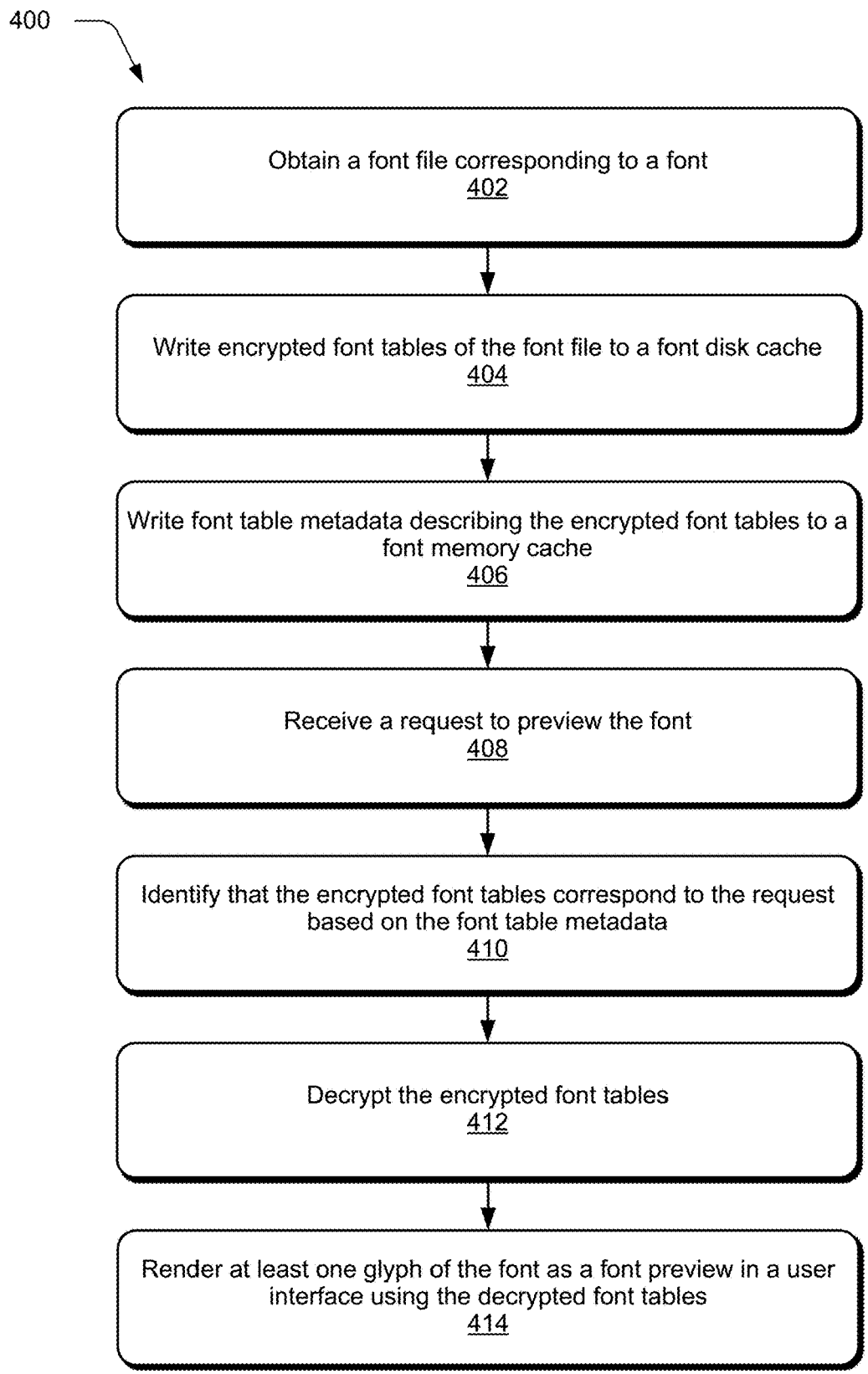
FIG. 4 is a flow diagram depicting a procedure in an example implementation in which a font is previewed within an application.

FIG. 4 is a flow diagram depicting a procedure 400 in an example implementation in which a font is previewed within an application. A font file corresponding to a font is obtained (block 402). For example, the computing device 102 implements the font preview module 126 to obtain the font file. Encrypted font tables of the font file are written to a font disk cache (block 404). In an example, the caching module 206 writes the encrypted font tables to the font disk cache. Font table metadata describing the encrypted font tables is written to a font memory cache (block 406). In one or more implementations, the caching module 206 writes the font table metadata to the font memory cache.

A request to preview the font is received (block 408). In one example, the font preview module 126 receives the request to preview the font. A correspondence between the encrypted font tables and the request is identified (block 410) based on the font table metadata. For example, the caching module 206 identifies that the encrypted font tables correspond to the request based on the font table metadata. The encrypted font tables are decrypted (block 412). The caching module 206 decrypts the encrypted font tables in one example. At least one glyph of the font is rendered as a font preview in a user interface (block 414) using the decrypted font tables. For example, the design application 114 renders the at least one glyph of the font as the font preview using the decrypted font tables.

Figure 5A:
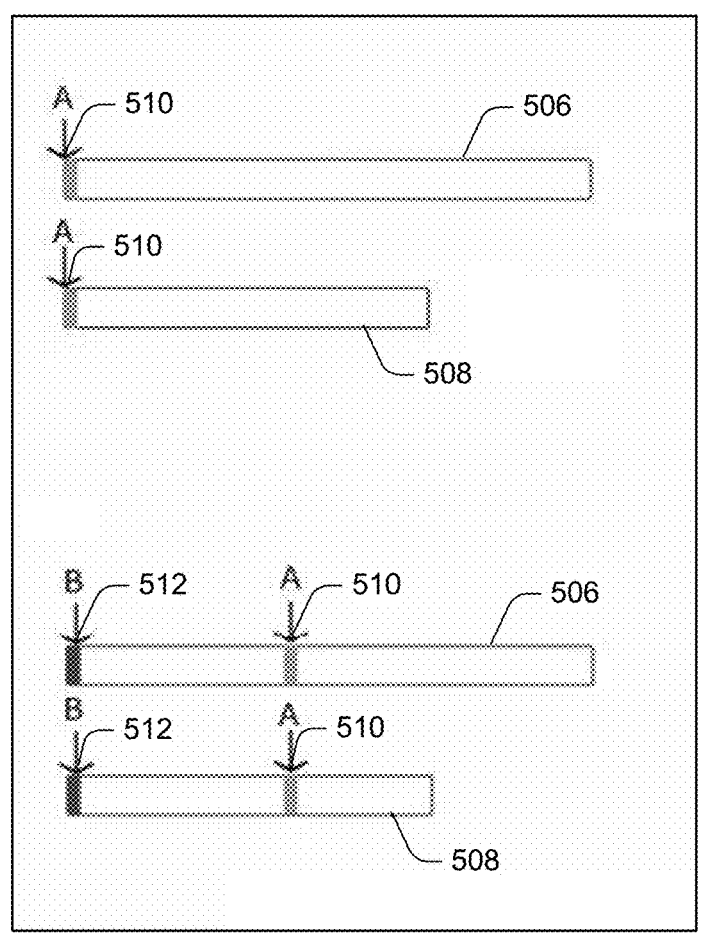
FIGS. 5A-5C are illustrations of representations of a font memory cache and a font disk cache in example writing operations.
Figure 5B:
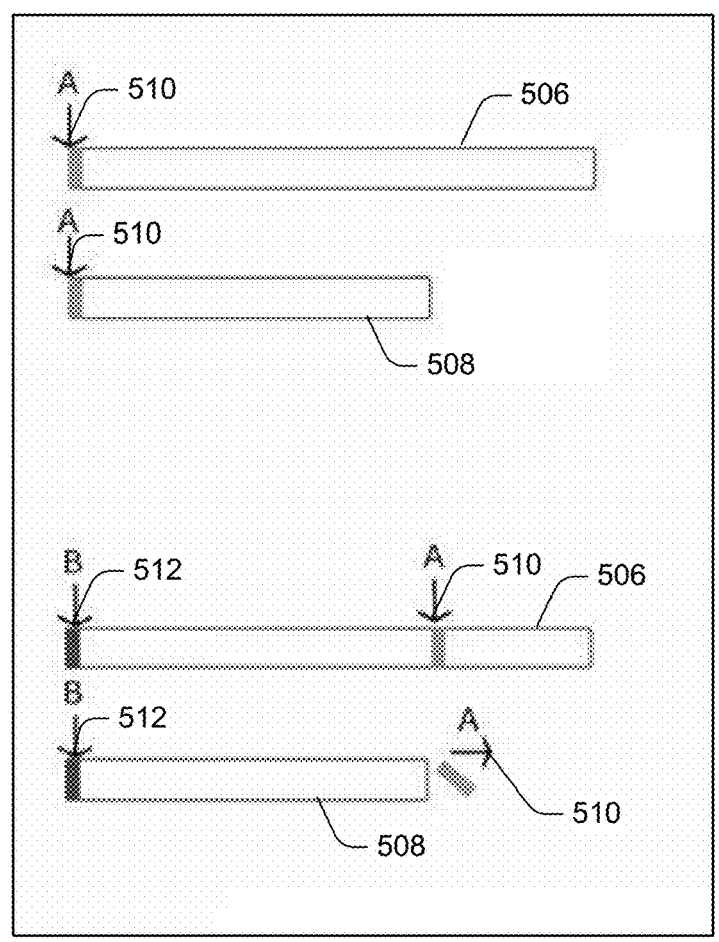
Figure 5C:
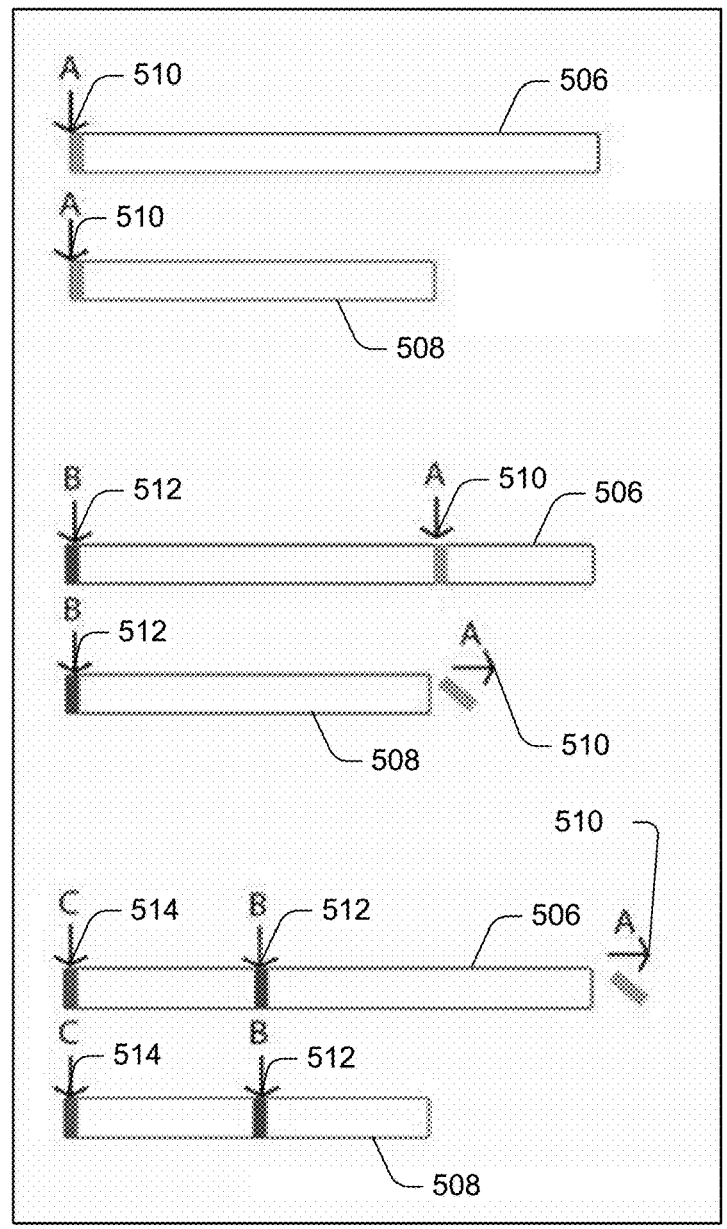

FIGS. 5A-5C are illustrations of representations of a font memory cache and a font disk cache in example writing operations. FIG. 5A illustrates a representation 500 of example writing operations when a font memory cache is not full and when a font disk cache is not full. FIG. 5B illustrates a representation 502 of example writing operations when a font memory cache is not full and when a font disk cache is full. FIG. 5C illustrates a representation 504 of example writing operations when a font memory cache is full and when a font disk cache is full.

As shown in FIG. 5A, the representation 500 includes a font memory cache 506 and a font disk cache 508. The font memory cache 506 and/or the font disk cache 508 may be included as part of memory/storage 118. The management module 306 implements the memory cache module 312 to write data 510 to the font memory cache 506. The memory cache module 312 writes data 510 to a least recently used portion of the font memory cache 506 in an example. As shown, the management module 306 implements the disk cache module 314 to write data 510 to the font disk cache 508. For example, the disk cache module 314 may write data 510 to a least recently used portion of the font disk cache 508.

As illustrated, the management module 306 implements the memory cache module 312 to write data 512 to the font memory cache 506. In one example, the memory cache module 312 writes data 512 to a least recently used portion of the font memory cache 506. As further illustrated, the management module 306 implements the disk cache module 314 to write data 512 to the font disk cache 508. The disk cache module 314 may write data 512 to a least recently used portion of the font disk cache 508. Accordingly, when the font memory cache 506 is not full and when the font disk cache 508 is not full, data 510 and data 512 are written to both the font memory cache 506 and the font disk cache 508.

As depicted in FIG. 5B, the representation 502 includes the font memory cache 506 and the font disk cache 508. For example, the management module 306 implements the memory cache module 312 to write data 510 to the font memory cache 506. The memory cache module 312 may write data 510 to a least recently used portion of the font memory cache 506. As shown, the management module 306 implements the disk cache module 314 to write data 510 to the font disk cache 508. In one example, the disk cache module 314 writes data 510 to a least recently used portion of the font disk cache 508.

The management module 306 additionally implements the memory cache module 312 to write data 512 to the font memory cache 506. For example, the memory cache module 312 writes data 512 to a least recently used portion of the font memory cache 506. As further illustrated, the management module 306 implements the disk cache module 314 to write data 512 to the font disk cache 508. In an example, the disk cache module 314 writes data 512 to a least recently used portion of the font disk cache 508. As shown, when the font memory cache 506 is not full and when the font disk cache 508 is full, data 512 may be written to both the font memory cache 506 and the font disk cache 508 and data 510 is deleted from the disk cache 508 since data 510 is the rear item in the font disk cache 508 in this example. In one example, the caching module 206 deletes data 510 from memory/storage 118.

As shown in FIG. 5C, the representation 504 includes the font memory cache 506 and the font disk cache 508. The management module 306 implements the memory cache module 312 to write data 510 to the font memory cache 506. In an example, the memory cache module 312 writes data 510 to a least recently used portion of the font memory cache 506. As illustrated, the management module 306 implements the disk cache module 314 to write data 510 to the font disk cache 508. In one example, the disk cache module 314 writes data 510 to a least recently used portion of the font disk cache 508.

The management module 306 implements the memory cache module 312 to write data 512 to the font memory cache 506. For example, the memory cache module 312 writes data 512 to a least recently used portion of the font memory cache 506. As additionally shown, the management module 306 implements the disk cache module 314 to write data 512 to the font disk cache 508. In an example, the disk cache module 314 writes data 512 to a least recently used portion of the font disk cache 508. As further illustrated, when the font memory cache 506 is full and when the font disk cache 508 is full, data 512 may be written to both the font memory cache 506 and the font disk cache 508 and data 510 is deleted from the disk cache 508 since data 510 is the rear item in the disk cache 508 in this example.

As further shown in FIG. 5C, the management module 306 implements the memory cache module 312 to write data 514 to the font memory cache 506. In an example, the memory cache module 312 writes data 514 to a least recently used portion of the font memory cache 506. The memory cache module 312 may delete data 510 from the font memory cache 506 because the font memory cache 506 is full and data 510 is the rear most item in the memory cache 506. As shown, the management module 306 implements the disk cache module 314 to write data 514 to the font disk cache 508. In one example, the disk cache module 314 writes data 514 to a least recently used portion of the font disk cache 508. In the illustrated example, data 512 and data 514 are included in both the font memory cache 506 and the font disk cache 508 and data 510 has been deleted from the font memory cache 506 and the font disk cache 508.

Figure 6A:
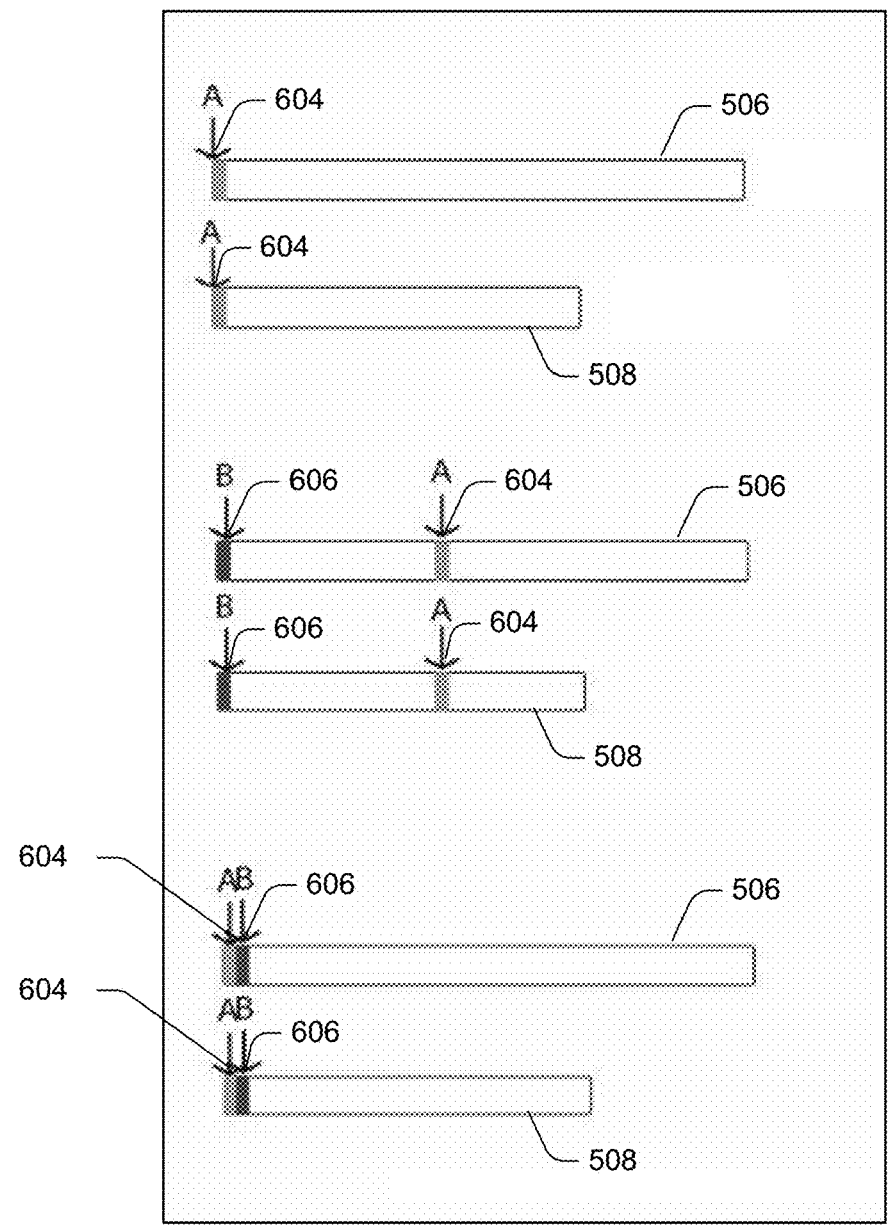
FIGS. 6A and 6B are illustrations of representations of a font memory cache and a font disk cache in example reading operations.
Figure 6B:
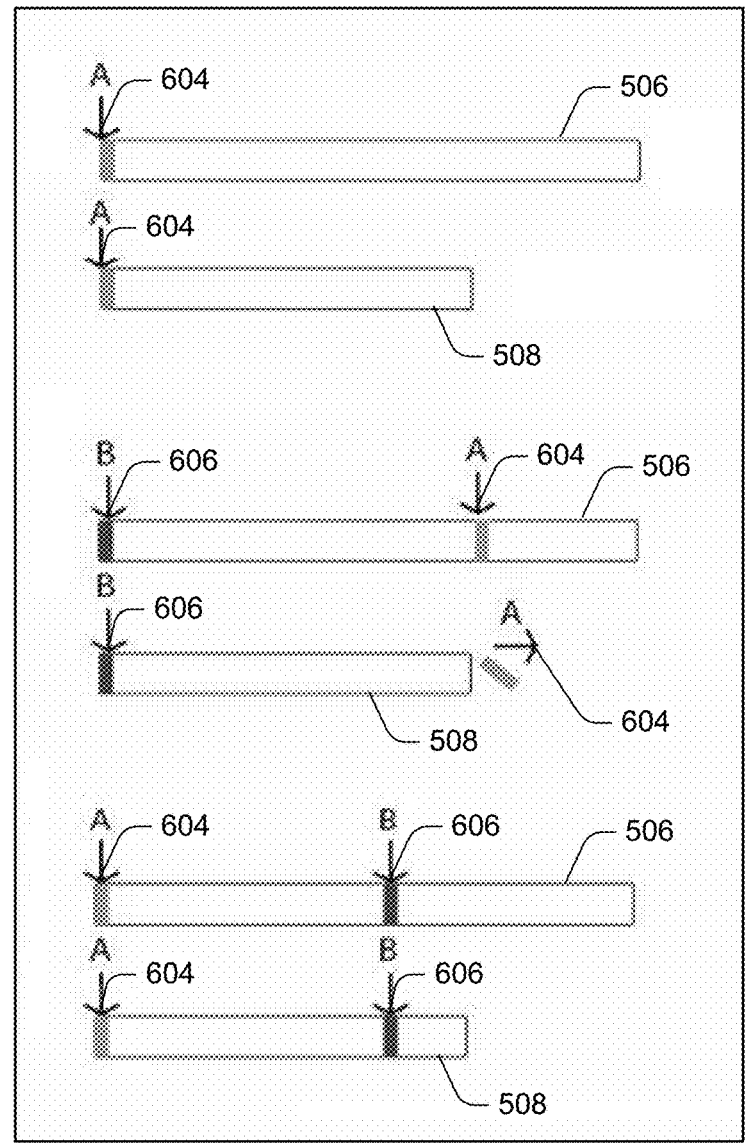

FIGS. 6A and 6B are illustrations of representations of a font memory cache and a font disk cache in example reading operations. FIG. 6A illustrates a representation 600 of example reading operations when data is present in the font memory cache 506 and when the data is present in the font disk cache 508. FIG. 6B illustrates a representation 602 of example reading operations when data is present in the font memory cache 506 and when the data is not present in the font disk cache 508.

As shown in FIG. 6A, the management module 306 has implemented the memory cache module 312 to write data 604 to the font memory cache 506 and the management module 306 has also implemented the disk cache module 314 to write data 604 to the font disk cache 508. As further shown, the memory cache module 312 is implemented to write data 606 to the font memory cache 506 and the disk cache module 314 is implemented to write data 606 to the font disk cache 508. In an example in which the font memory cache 506 and the font disk cache 508 are not full and when data 604 is read, the memory cache module 312 moves data 604 to the front of the font memory cache 506 and the disk cache module 314 moves data 604 to the front of the font disk cache 508.

As shown in FIG. 6B, the management module 306 has again implemented the memory cache module 312 to write data 604 to the font memory cache 506 and the management module 306 has implemented the disk cache module 314 to write data 604 to the font disk cache 508. The management module 306 can further implement the memory cache module 312 to write data 606 to the font memory cache 506 and after this operation, the font memory cache 506 includes data 606 and data 604. As illustrated, the disk cache module 314 is implemented to write data 606 to the font disk cache 508. In an example in which the font disk cache 508 is full, data 604 is deleted from the font disk cache 508, e.g., if data 604 is the rear most item in the font disk cache 508.

As further shown in FIG. 6B, data 604 is now read and data 604 is initially available in the font memory cache 506 but not available in the font disk cache 508. Since data 604 is read, the memory cache module 312 is implemented to write data 604 to the font memory cache 506. Again because data 604 is read, the disk cache module 314 is also implemented to write data 604 to the font disk cache 508. Thus, data 604 is now included in both the font memory cache 506 and the font disk cache 508 in this example.

Figure 7A:
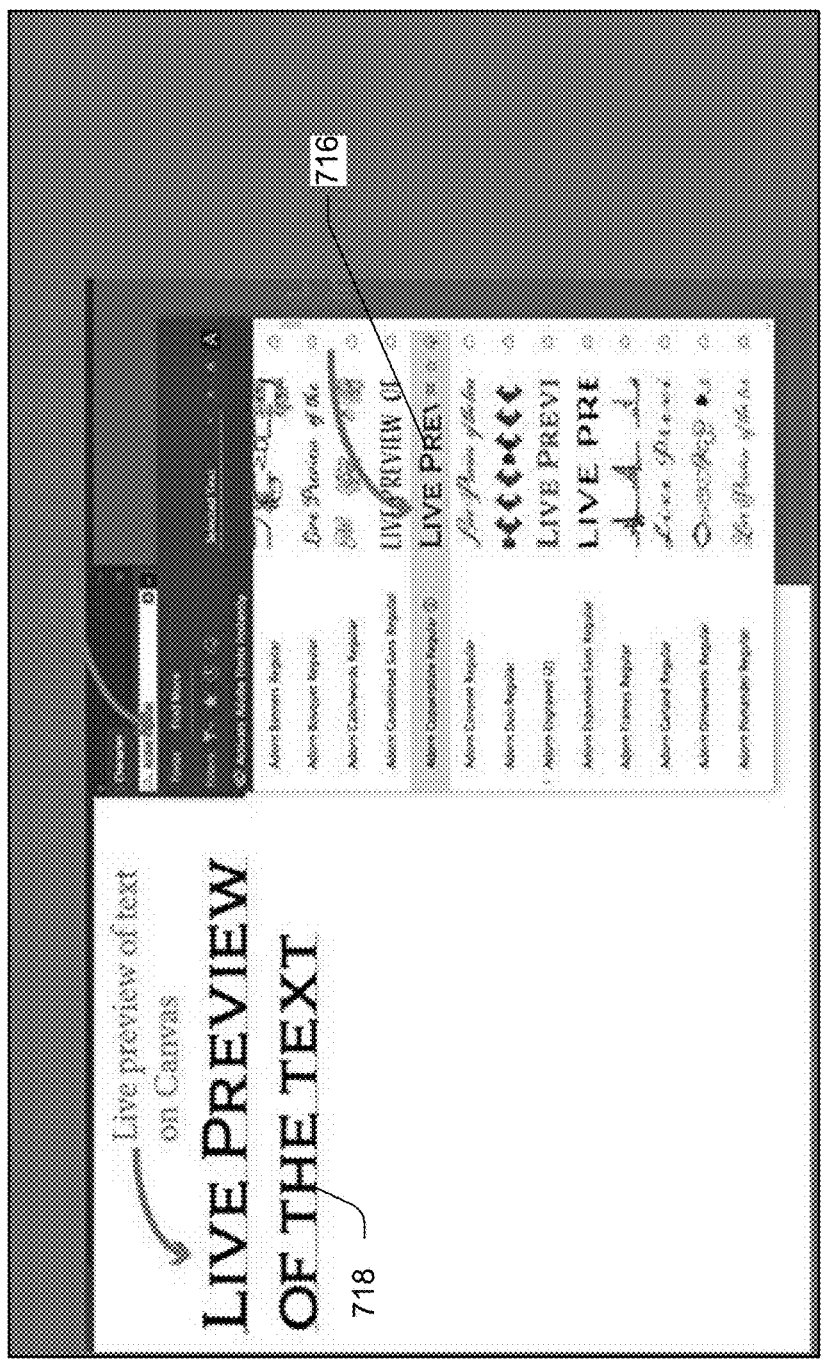
Figure 7B:
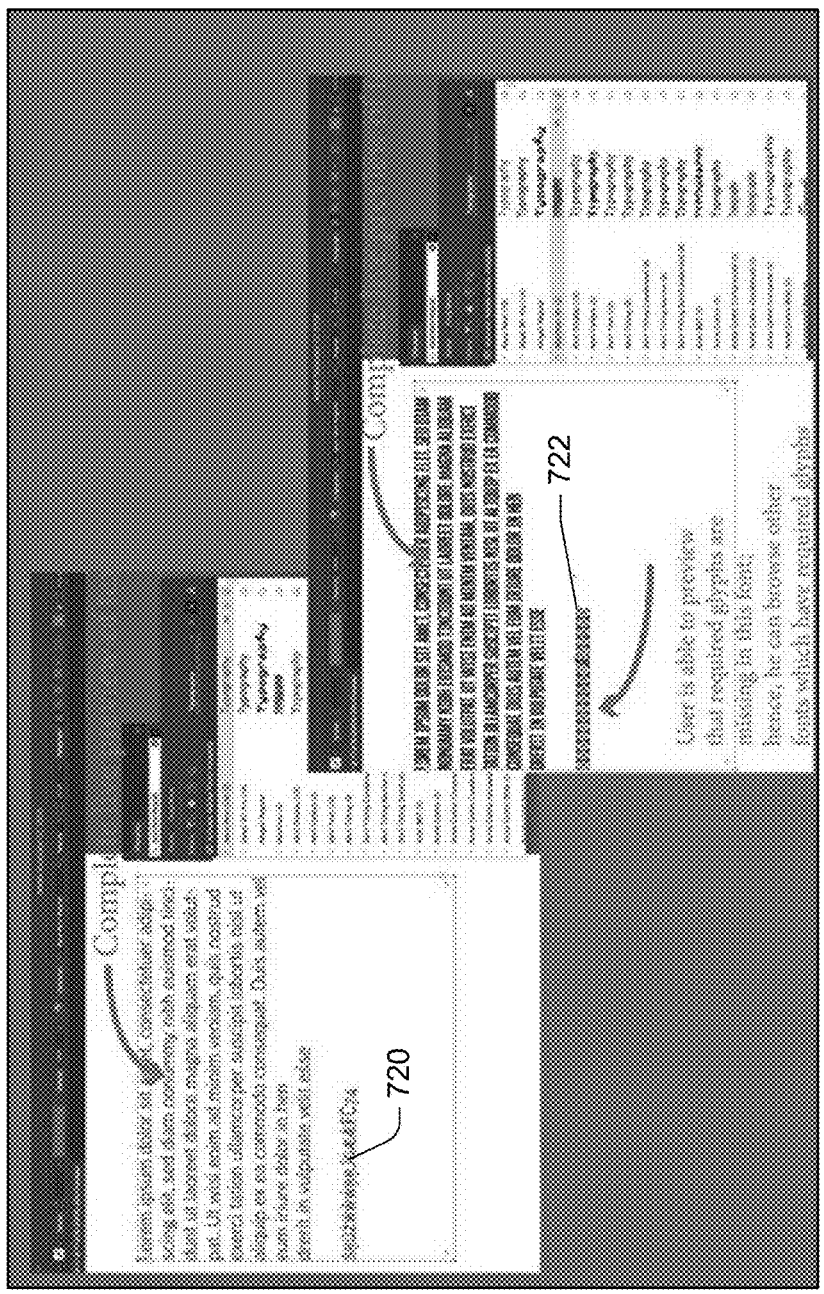
Figure 7C:
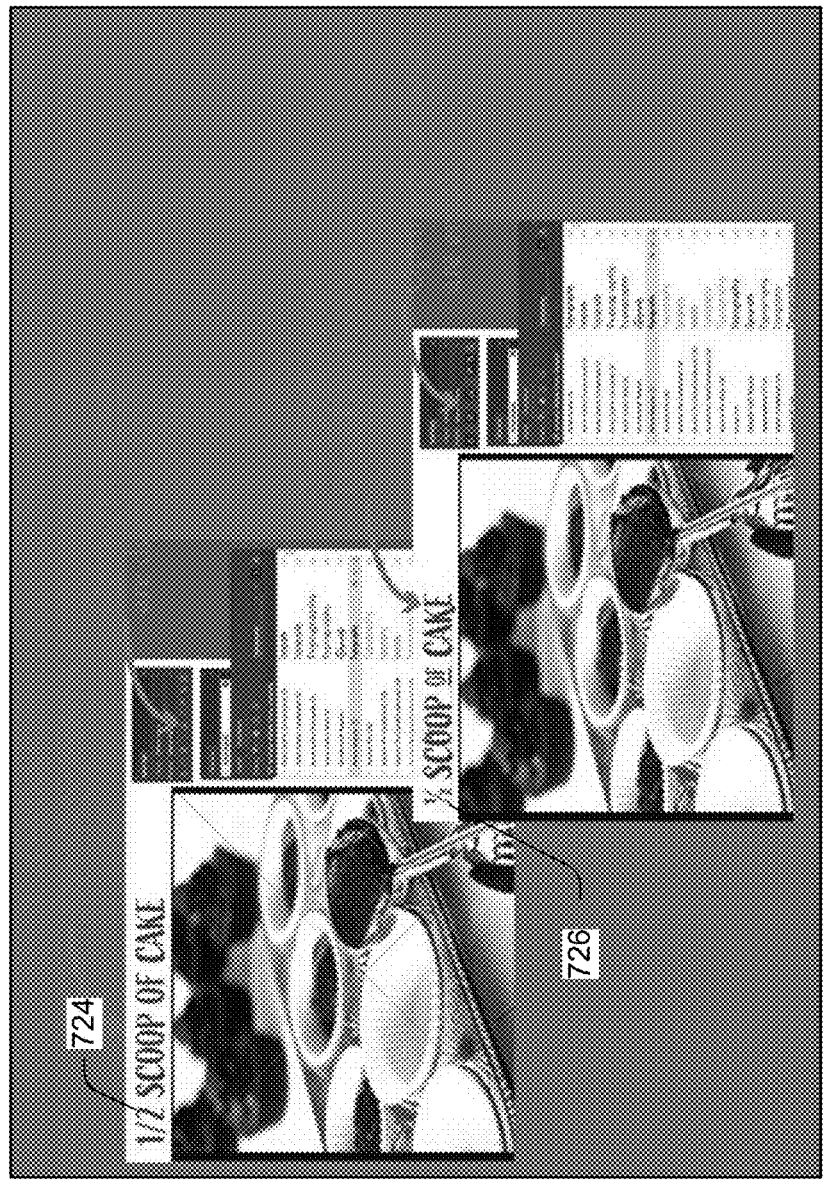
Figure 7D:
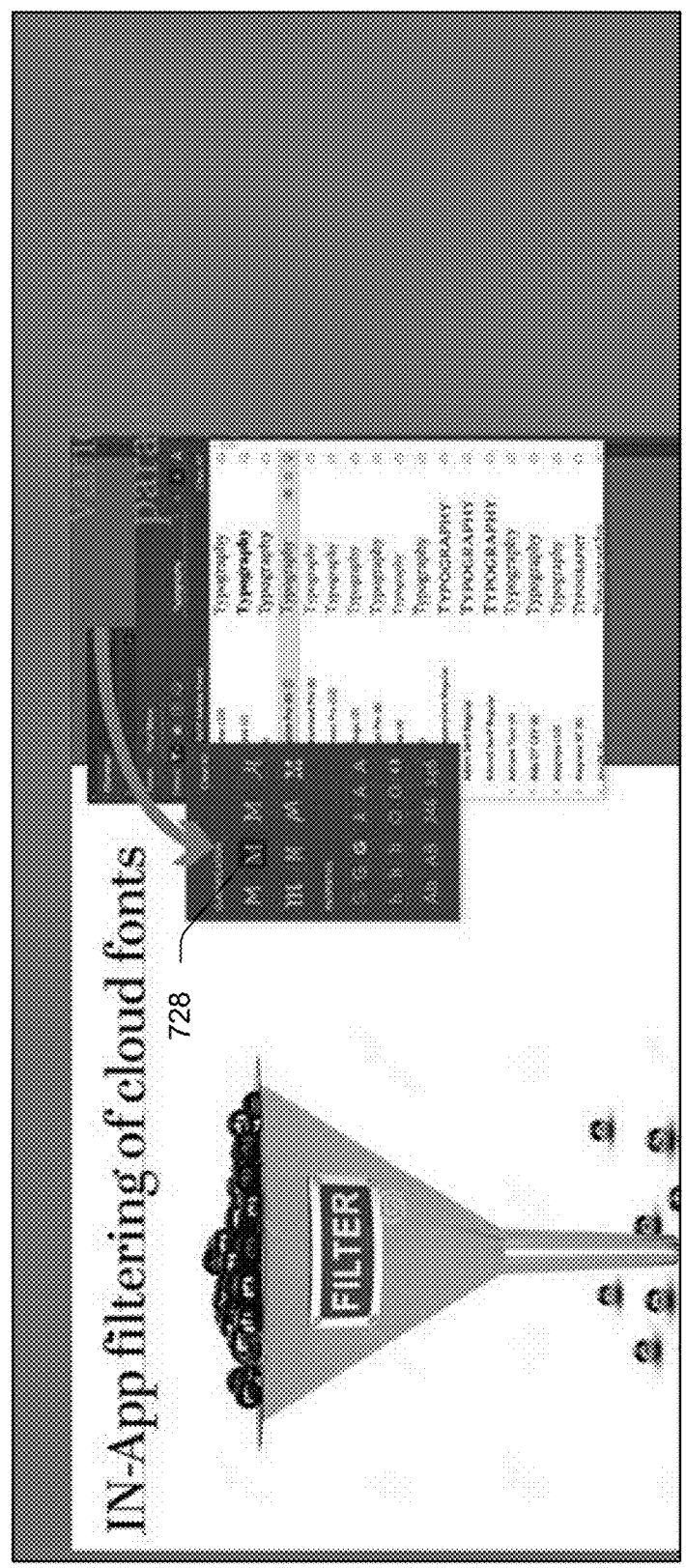
Figure 7E:
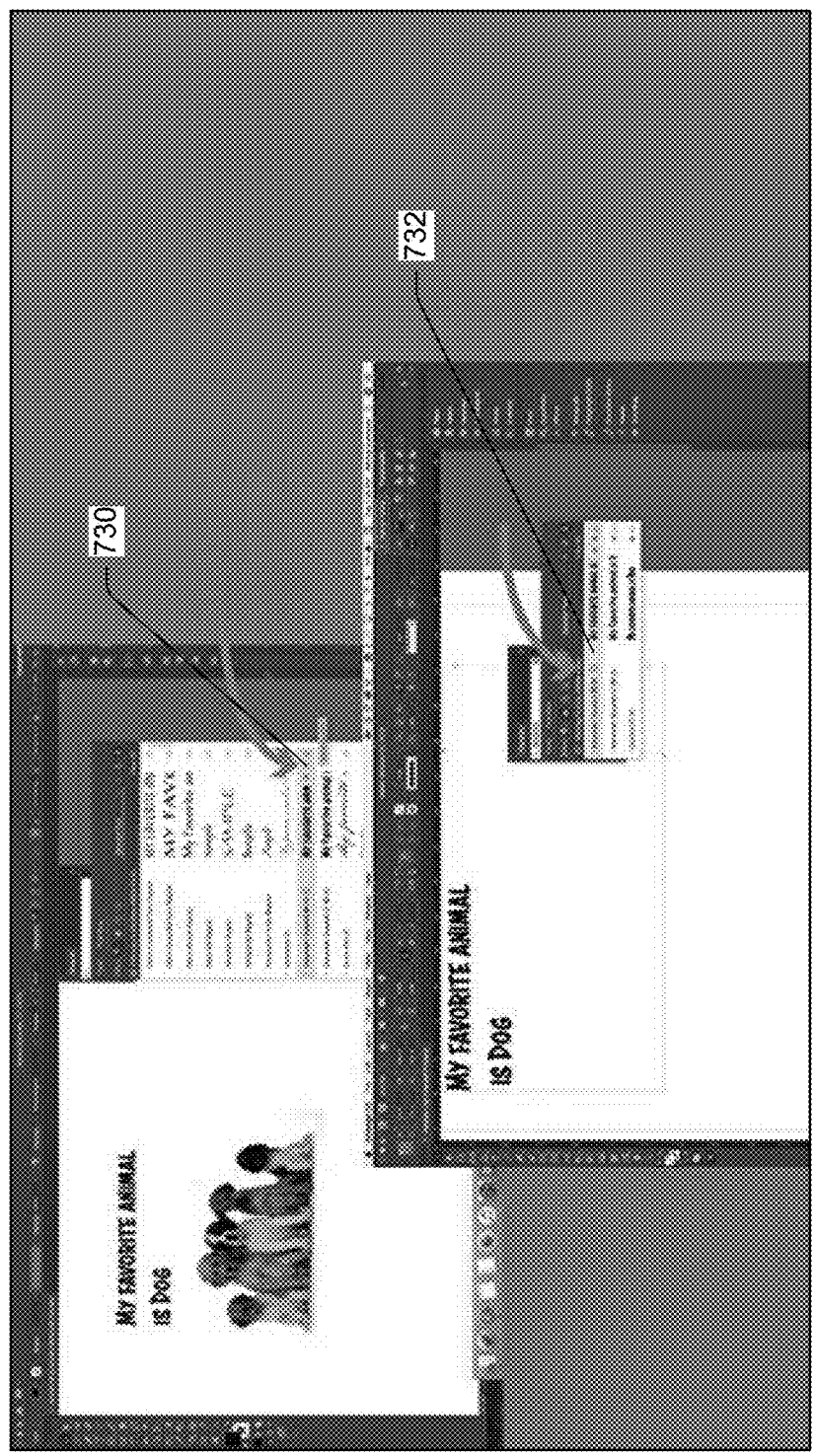
Figure 77:
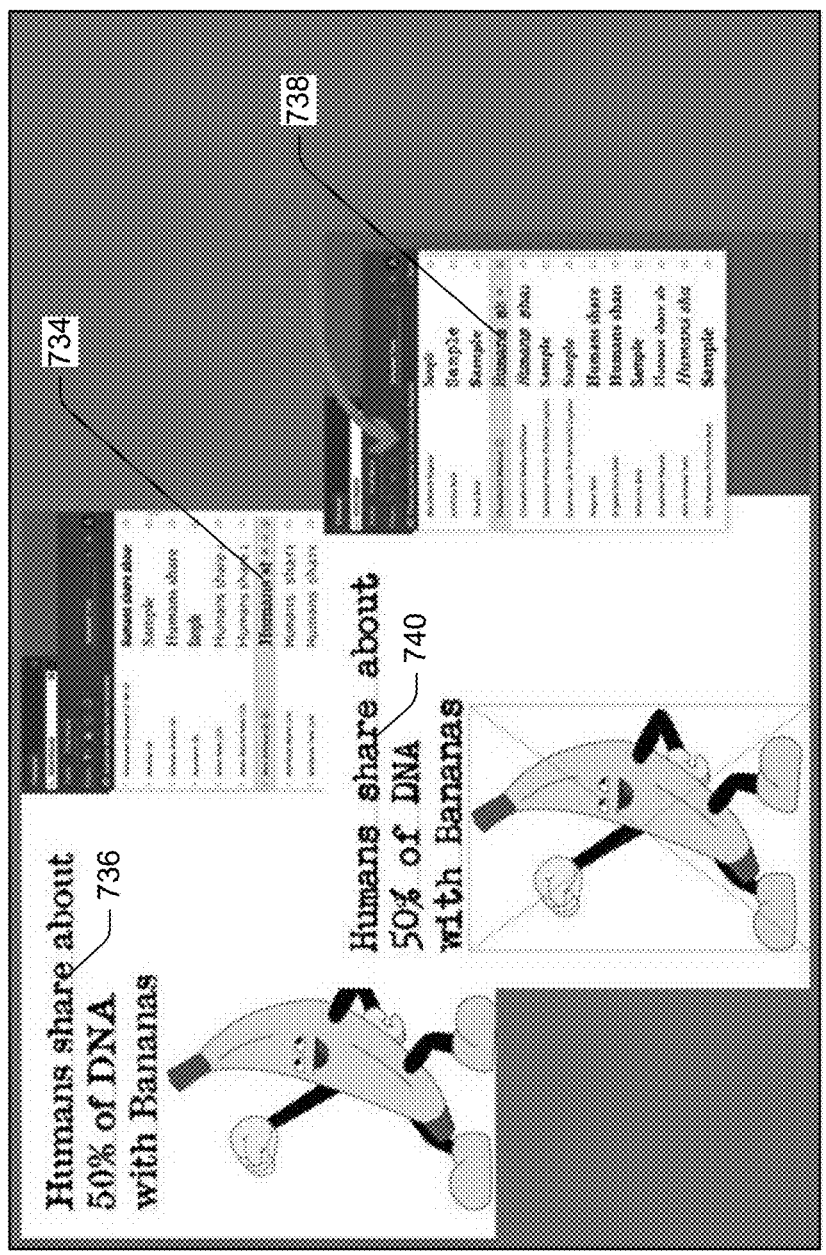
Figure 7G:
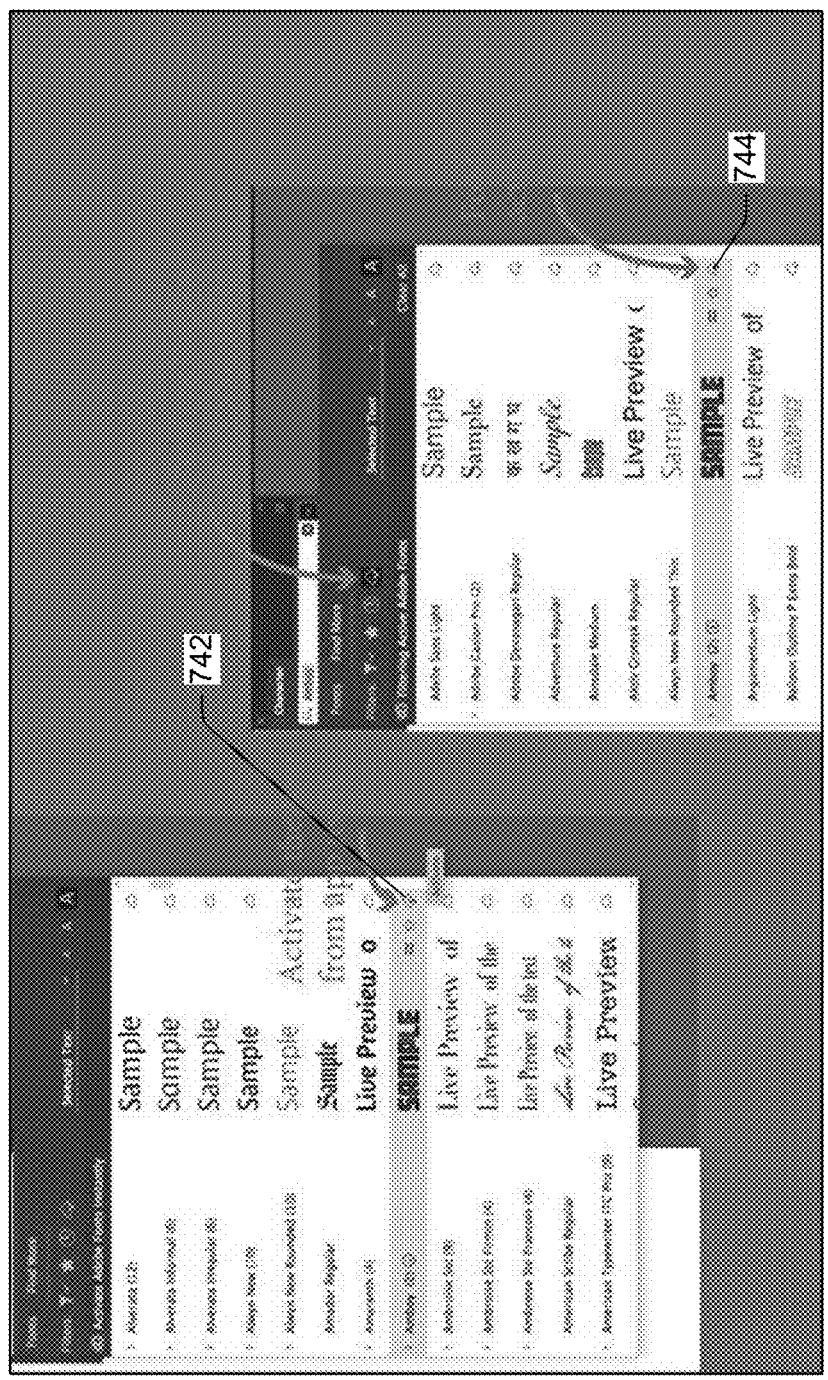
Figure 7H:
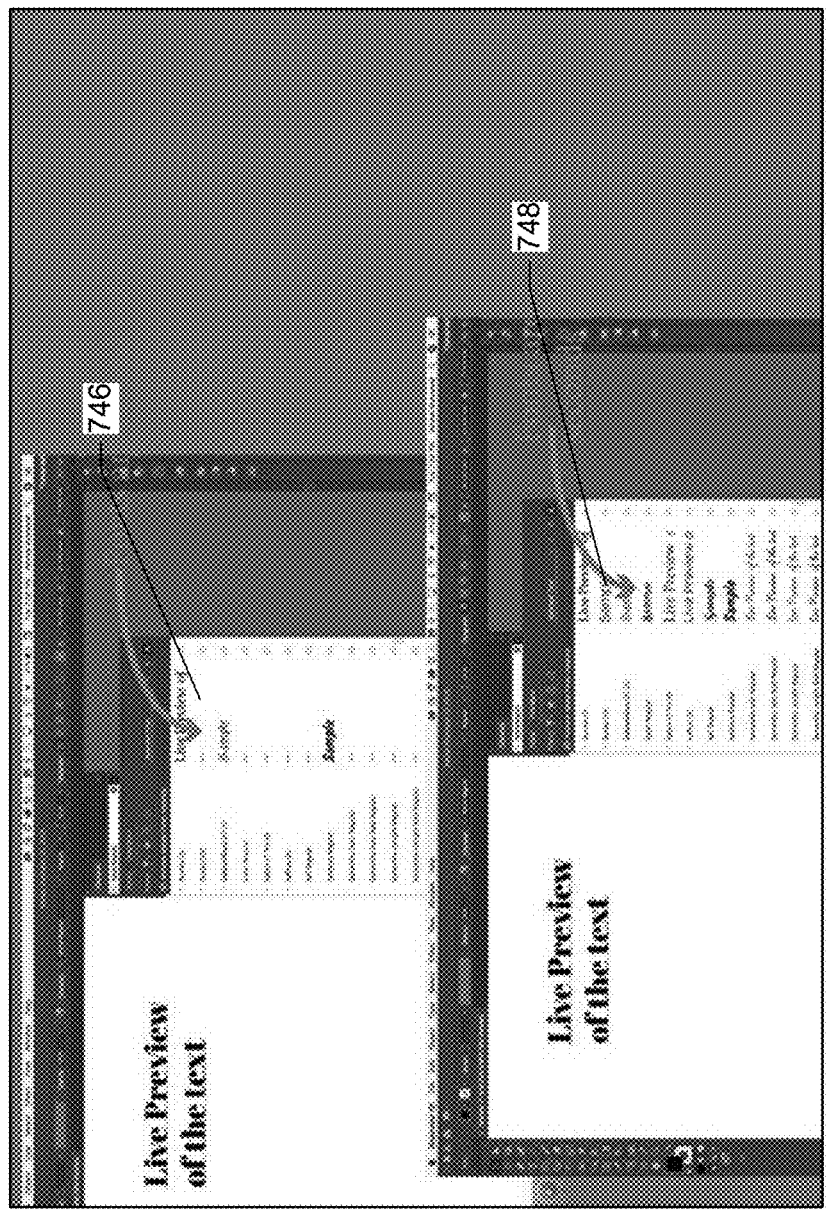

FIGS. 7A-7H are illustrations of examples of application-based font previewing. FIG. 7A illustrates example 700 of a user selection of a representative or default font of a font family FIG. 7B illustrates example 702 of an indication that a font being previewed is missing glyphs. FIG. 7C illustrates example 704 of available OpenType features in a font preview. FIG. 7D illustrates example 706 in which a user filters fonts of the font repository 106 within an interface of the design application 114. FIG. 7E illustrates example 708 in which a user favorites a font of the font repository 106 within an interface of the design application 114. FIG. 7F illustrates example 710 of a user browsing fonts of the font repository 106 which are similar to a font available to the design application 114 and the computing device 102. FIG. 7G illustrates example 712 of a user acquiring a font of the font repository 106 within an interface of the design application 114. FIG. 7H illustrates example 714 which shows the design application 114 leveraging the catalog data 214 to render glyphs of representative or default fonts of font families within an interface of the design application 114.

As shown in FIG. 7A, the example 700 includes a representative or default font 716 which is selected in an interface of the design application 114. In response to the selection of the representative of default font 716, glyphs 718 of the font 716 are rendered in a digital canvas of the design application 114. For example, the design application 114 receives an indication of the selection of the font 716 as part of the input data 122. In this example, the design application 114 generates the preview request 224 as including the indication of the selection of the font 716.

The preview module 208 receives the preview request 224, and the preview module 208 can access the available font data 222 to locate a font file or font tables of a font file corresponding to the font 716. As previously described, this functionality may be implemented in different ways. In one example, the font tables of the font 716 may be available in the font memory cache 506 and the caching module 206 can write the font tables to the available font data 222 or otherwise make the font tables available to the preview module 208. In another example, the font tables of the font 716 are available in the font disk cache 508 and the caching module 206 decrypts the font tables (e.g., using font table metadata) and writes the decrypted font tables to the available font data 222 or otherwise make the decrypted font tables available to the preview module 208.

In yet another example, the font file corresponding to the font 716 is available in the font repository 106 and the caching module 206 can communicate a font file request 216 including a font ID associated with the font 716 to the font repository 106 via the network 104. In this example, the caching module 206 receives the font file corresponding to the font 716, for example, as part of download data 220, and the caching module 206 writes the font file to the available font data 222 or otherwise makes the font file available to the preview module 208. In response to locating the font file corresponding to the font 716, the preview module 208 generates the preview data 226 as including the font file or tables of the font file corresponding to the font 716. For example, the design application 114 receives the preview data 226 and the design application 114 uses the font file or font tables from the preview data 226 to render the glyphs 718 in the digital canvas for previewing.

As illustrated in FIG. 7B, the example 702 includes glyphs 720 of a first font which are missing 722 from a second font. By indicating that the glyphs 720 of the first font are missing 722 from the second font being previewed, a digital artist can evaluate the second font based on an importance of the glyphs 720 to digital artwork. As depicted in FIG. 7C, the example 704 includes rendered glyphs 724 of a font being previewed and rendered glyphs 726 of the font modified using OpenType features. By providing this functionality in a preview of the font, the described systems allow the digital artist full font functionality to evaluate the font within the design application 114.

As shown in FIG. 7D, the example 706 includes selection of a classification 728 by which to filter the fonts of the font repository 106. The catalog data 214 can include a classification of each font included as part of the catalog data 214. Examples of such classifications include serif, san-serif, handwritten, etc. For example, the design application 114 can access the catalog data 214 in response to the selection of the classification 728, and the design application 114 can process the catalog data 214 such as to render indications of additional fonts which include the classification 728 in an interface of the design application 114.

As illustrated in FIG. 7E, the example 708 includes a favorite font 730 in an interface of the design application 114 which also is a favorite font 732 in an interface of an additional design application. The design application 114 can receive a request to indicate a font is a favorite font as part of the input data 122. In an example, the design application 114 communicates this request to the font preview module 126 as part of the use data 228. The font preview module 126 may receive the request, and the font preview module 126 can transmit this request to the font repository 106 via the network 104.

The font repository 106 may receive the request and identify additional favorite fonts based on a user ID associated with the request. The font repository 106 can transmit an indication that the font is a favorite font to the font preview module 126 via the network 104. The font repository 106 may also transmit additional indications that additional fonts are favorite fonts associated with the user ID. In this way, a user's favorite fonts can be leveraged across multiple applications such as the design application 114 and the additional application. Moreover, the design application 114 and the additional application are not necessarily common to the computing device 102 in order to provide this functionality. Thus, the design application 114 may be executed locally on the computing device 102 and the additional application may be executed locally on another computing device.

As shown in FIG. 7F, the example 710 includes selection of a local font 734 which is rendered as glyphs 736 and selection of a similar font 738 of the font repository 106 which is rendered as glyphs 740. The catalog data 214 can include data describing the local font 734 and the similar font 730 as being similar fonts, and the catalog data 214 can include additional similar fonts associated with the local font 734. In one example, the catalog data 214 includes a list of similar fonts for each font included as part of the catalog data 214. In another example, similar fonts can be visually similar fonts or similar fonts can be related in some other manner such as being part of a collection of fonts or being associated with a particular font creator.

As illustrated in FIG. 7G, the example 712 includes an indication 742 of a request to activate or acquire a font of the font repository 106 as well as an indication 744 that the font is activated or acquired within the design application 114. The design application 114 receives the indication 742 of the request to activate or acquire the font as part of the input data 122. The design application 114 may then communicate the indication 742 of the request to activate or acquire the font to the font preview module 126 as part of the use data 228. The font preview module 126 may receive the indication 742 of the request to activate or acquire the font as part of the use data 228, and the font preview module 126 can communicate the indication 742 of the request to activate or acquire the font to the font repository 106 via the network 104. The font preview module 126 can transmit the indication 742 of the request as well as a font ID associated with the font and a user identification associated with a user of the design application 114.

Consider an example in which the font repository 106 receives the indication 742 of the request via the network 104 as well as the user identification associated with the design application 114 and the font ID associated with the font. In this example, the font repository 106 associates the font ID and the user identification to activate the font for the design application 114. Continuing this example, the font repository 106 can also activate the font for additional applications associated with the user identification. In one example, the font repository 106 may activate the font for each application associated with the user identification such that the activated font will be available as active across each application associated with the user identification.

The font repository 106 can transmit an indication that the font has been activated to the font preview module 126 via the network 104. The font preview module 126 can receive the indication that the font has been activated from the font repository 106 via the network 104, and the font preview module 126 can access the memory/storage 118 to determine if a font file associated with the font ID is included as part of the memory/storage 118. In an example in which the font file associated with the font ID is included as part of the memory/storage 118, then the font preview module 126 can make the font file available to the design application 114, e.g., by decrypting the font file. In an example in which the font file associated with the font ID is not included as part of the memory/storage 118 or the font file is only partially available in the memory/storage 118, then the font preview module 126 generates a font file request 216 for the font file as previously described.

As shown in FIG. 7H, the example 714 includes an indication 746 of a request to retrieve a font for previewing as well as an indication 748 that the requested font is available for previewing. In one example, the font preview module 126 includes a file locking mechanism such that the design application 114 is the only application of the computing device 102 which is responsible for interacting with the font preview module 126 to acquire font files corresponding to fonts of the font repository 106. Thus, the font preview module 126 can monitor acquisitions of font files corresponding to the fonts of the font repository 106 across applications such that if another application acquires a font file associated with a particular font, the particular font can also be previewed in the design application 114 as previously described. The font preview module 126 can also monitor acquisitions of font files with respect to a size limit of the font memory cache 506 and/or the font disk cache 508. This size limit is adjustable through user interaction with the design application 114.

Example Technological Improvements

The described systems exhibit improvements in relation to conventional systems and techniques, and examples of such improvements are presented in Table 1 below.

TABLE 1

Example Improvements

| Font Name | Total Font Size (kB) | Decryption Time (ms) | Selective Decryption (ms) |
|---|---|---|---|
| Apple Symbols | ~900 | ~10.8 | [~1.2, ~8.4] |
| Arial Unicode | ~23000 | ~320 | [~1.2, ~180] |
| Source Han Serif | ~24000 | ~368 | [~5, ~184] |

As shown in Table 1, data in column "Selective Decryption" includes decryption times for a smallest and a largest font table for fonts presented in corresponding rows of column "Font Name." As further shown, data in column "Decryption Time" includes decryption times for font files of the fonts presented in the corresponding rows. The smallest and the largest font tables are included in the font files of the fonts presented in the corresponding rows.

Additional example improvements exhibited by the described systems relative to conventional systems are presented in Table 2 below.

TABLE 2

Example Improvements

| Font Name | Total Font Size (kB) | Size of 'glyf' or 'CFF' Table (kB) | Reduced Size (kB) |
|---|---|---|---|
| Apple Symbols | ~900 | ~760 | ~100 |
| Arial Unicode | ~23000 | ~22400 | ~3000 |
| Source Han Serif | ~24000 | ~22600 | ~3000 |

As shown in Table 2, data in column "Reduced Size" includes example reduced sizes for fonts presented in corresponding rows of column "Font Name." As further shown, data in column "Size of 'glyf' or 'CFF' Table" includes sizes of glyf or CFF tables for font files of the fonts presented in the corresponding rows.

Example System and Device

Figure 8:
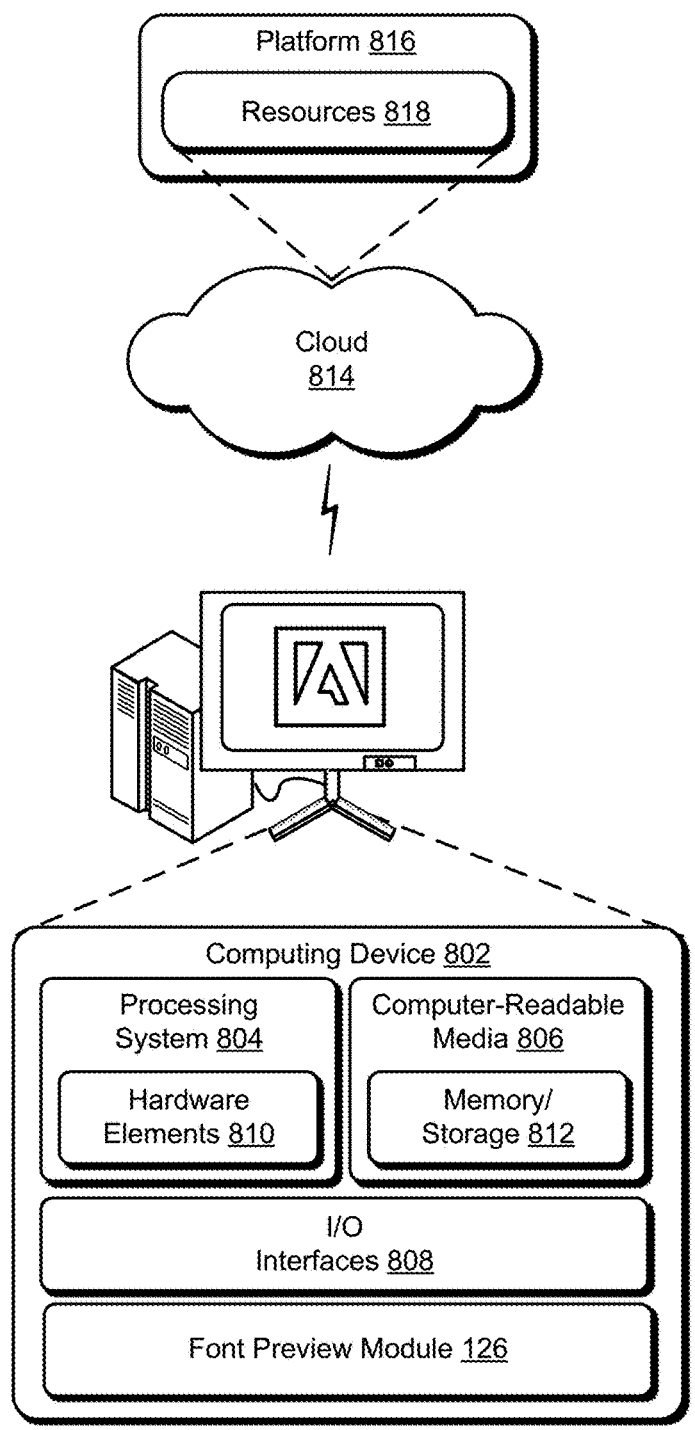
FIG. 8 illustrates an example system that includes an example computing device that is representative of one or more computing systems and/or devices that may implement the various techniques described herein.

FIG. 8 illustrates an example system 800 that includes an example computing device that is representative of one or more computing systems and/or devices that may implement the various techniques described herein. This is illustrated through inclusion of the font preview module 126. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources 818 and functions to connect the computing device 802 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although implementations of application-based font previewing have been described in language specific to structural features and/or methods, it is to be understood that the appended claims are not necessarily limited to the specific features or methods described. Rather, the specific features and methods are disclosed as example implementations of application-based font previewing, and other equivalent features and methods are intended to be within the scope of the appended claims. Further, various different examples are described and it is to be appreciated that each described example can be implemented independently or in connection with one or more other described examples.

What is claimed is:

1. In a digital medium environment to preview a font, a method implemented by a computing device, the method comprising:
    obtaining, by the computing device, a font file corresponding to the font;
    writing, by the computing device, encrypted font tables of the font file to a least recently used portion of a font disk cache of the computing device;
    writing, by the computing device, font table metadata describing the encrypted font tables to a least recently used portion of a font memory cache of the computing device;
    receiving, by the computing device, a request to preview the font;
    identifying, by the computing device, a portion of the encrypted font tables based on a font table offset and a block key described by the font table metadata;
    decrypting, by the computing device, the portion of the encrypted font tables without decrypting each of the encrypted font tables; and
    rendering, by the computing device, at least one glyph of the font as a font preview in a user interface using the decrypted portion of the encrypted font tables.

2. The method as described in claim 1, further comprising removing at least some of the encrypted font tables from the font disk cache.

3. The method as described in claim 1, further comprising:
receiving usage data from an application, the usage data describing glyphs of fonts rendered in the user interface;
generating a custom font table based on the usage data; and
encrypting the custom font table.

4. The method as described in claim 3, further comprising:
decrypting the custom font table; and
rendering the at least one glyph of the font as an additional font preview in the user interface using the decrypted custom font table.

5. The method as described in claim 1, wherein the obtaining is performed responsive to receiving the request.

6. The method as described in claim 1, further comprising deobfuscating the font file as part of the obtaining the font file.

7. The method as described in claim 1, wherein the portion of the encrypted font tables includes an encrypted CFF table, an encrypted glyf table, an encrypted OS/2 table, and an encrypted cmap table.

8. The method as described in claim 1, wherein the portion of the encrypted font tables includes a single custom font table.

9. A system comprising:
a download module implemented at least partially in hardware of a computing device to:
form a communication for receipt by a font repository, the communication including a font identification (ID) associated with a font; and
receive, in response to the communication, an obfuscated font file corresponding to the font (ID);
a caching module implemented at least partially in the hardware of the computing device to:
deobfuscate the obfuscated font file;
generate font table metadata describing font tables of the deobfuscated font file;
write the font table metadata to a least recently used portion of a font memory cache of the computing device;
encrypt the font tables of the deobfuscated font file;
decrypt an encrypted font table of the encrypted font tables using the font table metadata and without decrypting each of the encrypted font tables; and
render glyphs of the font as a font preview in a user interface.

10. The system as described in claim 9, wherein the caching module is further implemented write the encrypted font tables to a font disk cache of the computing device.

11. The system as described in claim 10, wherein the caching module is further implemented to remove at least a portion of the encrypted font tables from the font disk cache of the computing device.

12. The system as described in claim 9, wherein the glyphs of the font are rendered using the decrypted font table.

13. The system as described in claim 9, wherein the download module is further implemented to update a catalog file in response to receiving the obfuscated font file.

14. The system as described in claim 9, wherein the decrypted font table is a custom font table that includes characters of a CFF table and a glyf table that are used in a design application and characters in Unicode blocks having the characters of the CFF table and the glyf table that are used in the design application.

15. The system as described in claim 9, wherein the font table metadata describes a font table offset and a block key usable to identify the encrypted font table of the encrypted font tables.

16. In a digital medium environment to preview a font for selected text within an application, computer-readable storage media storing instructions thereon that, responsive to execution by a processing system, causes the processing system to perform operations comprising:
receiving preview request data from the application describing the font;
identifying an encrypted font table of encrypted font tables of a font file corresponding to the font using font table metadata that describes the encrypted font tables, the encrypted font table is a custom font table that includes characters of a CFF table and a glyf table that are used in the application and characters in Unicode blocks having the characters of the CFF table and the glyf table that are used in the application;
decrypting the encrypted font table of the font file without decrypting each of the encrypted font tables; and
rendering glyphs of the font as a font preview for the selected text in a user interface of the application using the decrypted font table.

17. The computer-readable storage media as described in claim 16, wherein the decrypted font table is written to a least recently used portion of a font memory cache.

18. The computer-readable storage media as described in claim 16, wherein the font table metadata includes a font table offset and a block key.

19. The computer-readable storage media as described in claim 16, the operations further comprising:
receiving additional preview request data describing an additional font;
forming a communication for receipt by a font repository, the communication including a font identification associated with the additional font; and
receiving, in response to the communication, an additional font file corresponding to the additional font.

20. The computer-readable storage media as described in claim 19, the operations further comprising updating a catalog file in response to receiving the additional font file.

* * * * *